United States Patent
Hui (10) Patent No.: US 11,808,976 B2
(45) Date of Patent: Nov. 7, 2023

(54) COMPACT ON-CHIP POLARIZATION SPLITTER-ROTATOR BASED ON BEZIER CURVE GRADIENT WAVEGUIDE

(71) Applicant: XI'AN UNIVERSITY OF POSTS & TELECOMMUNICATIONS, Xi'an (CN)

(72) Inventor: Zhanqiang Hui, Xi'an (CN)

(73) Assignee: XI'AN UNIVERSITY OF POSTS & TELECOMMUNICATIONS, Xi'an (CN)

( * ) Notice: Subject to any disclaimer, the term of this patent is extended or adjusted under 35 U.S.C. 154(b) by 0 days.

(21) Appl. No.: 17/804,840

(22) Filed: May 31, 2022

(65) Prior Publication Data
US 2022/0381980 A1 Dec. 1, 2022

(30) Foreign Application Priority Data
Jun. 1, 2021 (CN) .......................... 202110607483.1

(51) Int. Cl.
*G02B 6/126* (2006.01)
(52) U.S. Cl.
CPC .................................. *G02B 6/126* (2013.01)
(58) Field of Classification Search
None
See application file for complete search history.

(56) References Cited

U.S. PATENT DOCUMENTS

2018/0136393 A1* 5/2018 Tu .......................... G02B 6/2766

FOREIGN PATENT DOCUMENTS

CN        108051889 A  *  5/2018  ............. G02B 6/126

OTHER PUBLICATIONS

Translation of CN108051889A (Year: 2018).*

* cited by examiner

*Primary Examiner* — Chad H Smith
(74) *Attorney, Agent, or Firm* — Zhigang Ma (57) ABSTRACT

Disclosed is a compact on-chip polarization splitter-rotator based on a Bezier curve gradient waveguide. The Bezier curve gradient waveguide structure is a standard SOI-based wafer structure, comprising a substrate, of which the bottom layer is buried with oxide ($SiO_2$), and the top is composed of silicon waveguides, including a common output waveguide and a specially-structured waveguide containing Bessel curve boundaries. The common waveguide structure is composed of a cuboid waveguide, and the specially-structured waveguide is composed of an input region, an output region, a width-gradient waveguide (Bezier curve gradient structure) and a coupling region, where a width of the gradient waveguide is determined by a third-order Bezier curve, and the coupling region is composed of two asymmetrical waveguide regions.

10 Claims, 9 Drawing Sheets

FIG. 7c

COMPACT ON-CHIP POLARIZATION SPLITTER-ROTATOR BASED ON BEZIER CURVE GRADIENT WAVEGUIDE

CROSS REFERENCE TO RELATED APPLICATION

This patent application claims priority to Chinese Patent Application No. 202110607483.1, filed on Jun. 1, 2021, the disclosure of which is incorporated herein by reference in its entirety as part of the present application.

TECHNICAL FIELD

The present disclosure relates to the technical field of fiber-optic communications, in particular to an on-chip polarization splitter-rotator.

BACKGROUND

In recent years, Photonic Integrated Circuits (PICs) based on Silicon on insulator (SOI) have gained rapid development. In addition to advantages of large scale, high density, high bandwidth and low power consumption, the PICs based on SOI also show compatibility with the Complementary Metal Oxide Semiconductor (CMOS) fabrication process. However, high birefringence exists in SOI devices due to the CMOS process and the properties of a material itself, thus different responses are generated in a circuit depending on different polarization modes, and polarization mode dispersion and loss generated thereby may greatly degrade the system performance. Single-mode silicon nano-photonic waveguides usually have birefringence as high as about 0.7, causing silicon photonic devices to be sensitive to polarization in general. It is hence required to preprocess the input of different polarization states to help free the whole circuit from dependence on polarization, namely polarization transparency. Therefore, a Polarization Splitter-Rotator (PSR) capable of realizing polarization diversity has a huge application prospect in PICs.

Due to the limitation of the fabrication process, a width of an SOI waveguide is generally greater than its height, and there is a larger effective refractive index difference between $TE_0$ mode and $TM_0$ mode. Accordingly, the current PSR commonly achieves polarization mode conversion with the aid of a high-order mode, the PSR being structurally composed of a $TM_0$-$TE_1$ polarization rotator and a $TE_1$-$TE_0$ mode converter in cascade connection. The majority of currently reported silicon-based integrated PSRs adopt a tapered or taper-ridged waveguide structure to achieve $TM_0$-$TE_1$ mode conversion, which is based on the following principle: with the asymmetrical distribution of refractive indexes on the waveguide cross section, mode conversion and polarization rotation are achieved through the mode hybridization between the $TM_0$ mode and the TE higher-order mode in a specific waveguide width interval. In the design process, a $TM_0$-$TE_1$ mode converter based on a tapered or taper-ridged waveguide has a higher requirement for the gradient slope of the waveguide, which should usually be small enough to ensure efficient mode coupling and complete energy transfer. This also means that such tapered or taper-ridged waveguide has a small side slope and a greater waveguide length, followed by a larger occupied area.

SUMMARY

An objective of the present disclosure is to solve the problems in the prior art that for the purpose of achieving efficient mode coupling and complete energy conversion, a waveguide has a large length, and a large area is occupied.

To achieve the foregoing objective, the present disclosure puts forward the following solutions:

A compact on-chip polarization splitter-rotator based on a Bezier curve gradient waveguide, where the compact on-chip polarization splitter-rotator based on the Bezier curve gradient waveguide includes a substrate, and a waveguide structure is disposed on the surface of the substrate; the waveguide structure includes a common output waveguide and a specially-structured waveguide which are parallel to each other, and are partitioned by an air gap $W_{gap}$ as a medium; the common output waveguide is a cuboid in structure, and if the direction from input to output is denoted as a +Z direction, the specially-structured waveguide is composed of an input guide region, a Bezier curve gradient region, an asymmetrical directional coupling region, and an output guide region which are cascaded sequentially in the +Z direction; the common output waveguide corresponds to the asymmetrical directional coupling region and the output guide region in the +Z direction.

Optionally, the substrate is made of silicon dioxide.

Optionally, the input guide region, the Bezier curve gradient region, the asymmetrical directional coupling region, and the output guide region are all made of silicon.

Optionally, the substrate has a thickness of 2 μm, and the common output waveguide and the specially-structured waveguide each have a thickness of 220 nm.

Optionally, the Bezier curve gradient region is gradually widened in the +Z direction, and has an outer contour defined by a third-order Bezier curve.

Optionally, a length of the Bezier curve gradient region is denoted as $L_{tp}$, poles of the third-order Bezier curve for the outer contour are determined to be located at a front end point, $P_2$, $P_3$ and a back end point of a waveguide in a region, respectively, where the point $P_2$ has a same location as the back end point in the +X direction, and is located at ⅓ of $L_{tp}$ in the +Z direction, and the point $P_3$ has a same location as the front end point in the +X direction, and is located at ⅔ of $L_{tp}$ in the +Z direction.

Optionally, a width of the output guide region is decreased linearly in the +Z direction.

Optionally, a width of the input guide region is denoted as $W_1$, and is the same as that of an extreme terminal of the output guide region; a width of the asymmetrical directional coupling region is denoted as $W_2$, that is, a front-end width and a back-end width of the Bezier curve gradient region are $W_1$ and $W_2$, respectively, and an overall width of the specially-structured waveguide is increased to $W_2$ from $W_1$, and then decreased to $W_1$ from $W_2$.

Optionally, a width of the common output waveguide is denoted as $W_3$, $W_3$ being smaller than $W_1$.

Optionally, $W_1$=0.5 μm, $W_2$=0.86 μm, $W_3$=0.425 μm, $L_{tp}$=34 μm, $L_{DC}$=18 μm, and $W_{gap}$=0.1 μM.

The technical solution provided in embodiments of the present disclosure has the beneficial effects:

In the present disclosure, regarding a standard SOI-based wafer structure, a bottom layer is buried with oxide (BOX, $SiO_2$), and a top layer is composed of a common rectangular waveguide and a special waveguide structure. A Bezier curve gradient region and an asymmetrical directional coupling region in the special waveguide structure jointly realize the function of polarization rotating and splitting, such that the capability of efficient polarization rotating and splitting in the C+L+U waveband of fiber-optic communications is achieved. The structure parameters are optimized such that the function of polarization splitting and rotating is realized for two kinds of polarized light $TE_0$ and $TM_0$ within the bandwidth range of 200 nm (1,500 nm to 1,700 nm). During incidence of the $TE_0$ fundamental mode, loss IL<0.05 dB, the mode energy is output from a through terminal, and there is a high polarization extinction ratio (PER>20 dB). During incidence of the $TM_0$ fundamental mode, the mode energy is output from a cross terminal, the polarization conversion efficiency is higher than 96% (IL<0.15 dB), and there is a high polarization extinction ratio (PER>20 dB). Error analysis shows that under the waveguide width-height error of ±20 nm, the conversion efficiency only decreases by 0.35 dB, which ensures the yield of devices fabricated. Through the application of the Bezier curve gradient waveguide, the coupling length is reduced to 52 μm, and thus the waveguide belongs to single-layer etched SOI gradient waveguides, and is at the higher level among existing polarization splitter-rotators.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

Reference Numerals: 1. substrate; 2. common output guide waveguide; 3. specially-structured guide waveguide; 4. input guide region of a special waveguide structure; 5. Bezier curve gradient region of a special waveguide structure; 6. asymmetrical directional coupling region of a special waveguide structure; and 7. output guide region.

DETAILED DESCRIPTION OF THE EMBODIMENTS

In order to make the objectives, technical solutions, and advantages of the embodiments of the present disclosure clearer, the technical solutions in the embodiments of the present disclosure will be clearly and completely described below in conjunction with the accompanying drawings in the embodiments of the present disclosure. Obviously, the described embodiments are some, rather than all of the embodiments of the present disclosure. All other examples obtained by a person of ordinary skill in the art based on the examples of the present disclosure without creative efforts shall fall within the protection scope of the present disclosure.

Figure 1:
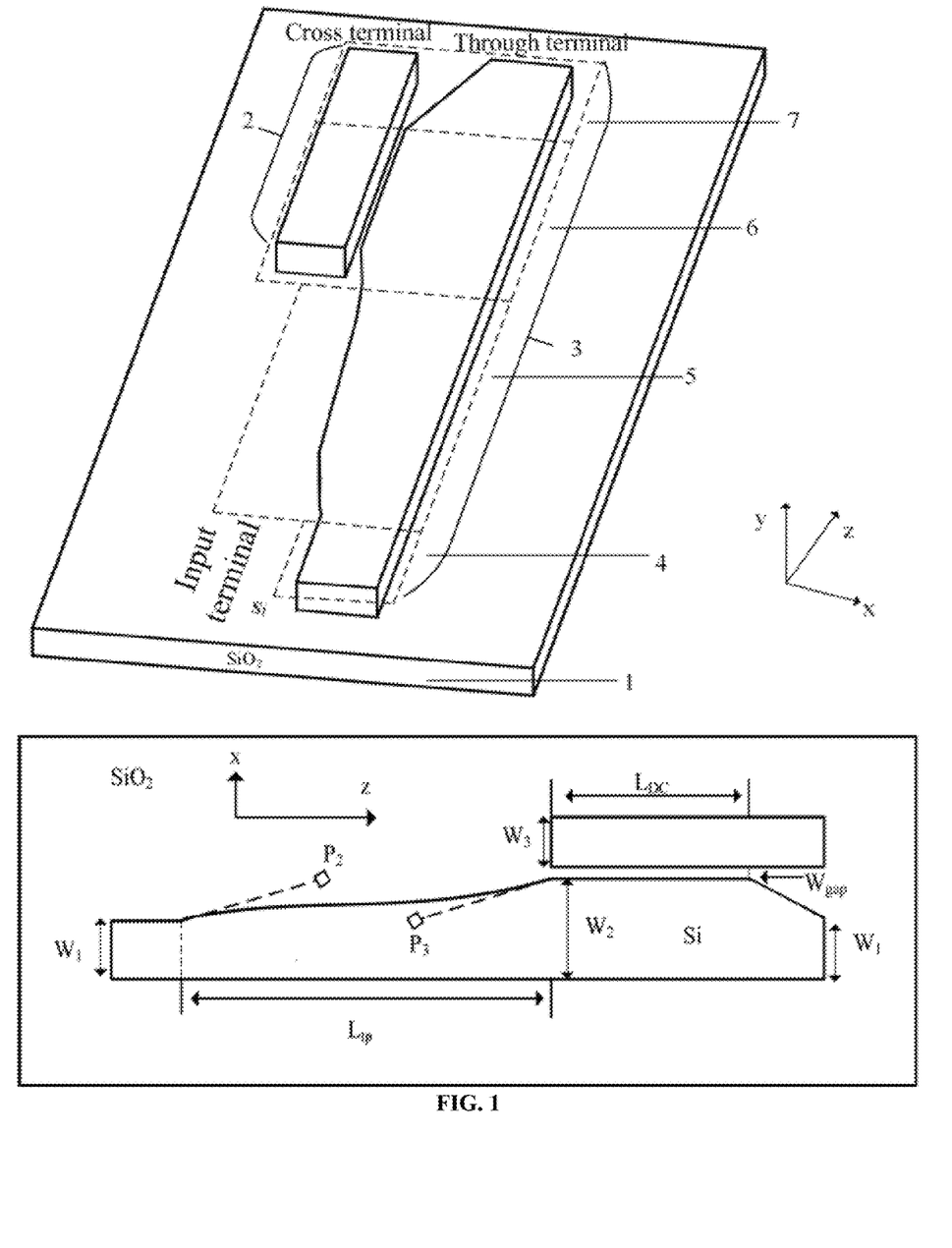
FIG. 1 is a schematic structural diagram of an on-chip polarization splitter-rotator based on a Bezier gradient waveguide according to an embodiment of the present disclosure, where the figure above is a three-dimensional structural view, and the figure below is a top view.

FIG. 1 is a schematic structural diagram of an on-chip polarization splitter-rotator based on a Bezier gradient waveguide according to the present disclosure. With reference to FIG. 1, the Bezier gradient waveguide includes an oxide substrate 1 composed of silicon dioxide; two segments of silicon waveguides with different structures are disposed at the top of the substrate 1, namely a common waveguide structure 2 and a special waveguide structure 3; the special waveguide structure includes a polarization splitter-rotator structure composed of an input region 4, a Bezier curve gradient region 5, a directional coupling region 6, and an output guide region 7, where the waveguides on the substrate 1 are both made of a silicon material.

It should be noted that since it is based on a general cascade structure, the structural size of a PSR is large, adding to the cost in fabrication. Therefore, proposed herein is a novel ultra-wideband PSR based on the principle of mode evolution, which is an effective solution that can split input light signals $TE_0$ and $TM_0$ and firstly indirectly convert the $TM_0$ mode into $TE_1$ mode, and into $TE_0$ for output. It is realized that while retaining the information carried by two orthogonal polarization signals, there is only one polarization state in a line, which avoids polarization-dependent dispersion and polarization-dependent loss. Therefore, the device is widely used in PICs, polarization division multiplexing coherent light communication and quantum communication, thus providing a reference for the miniaturization of photonic devices in the future.

In the previously reported PSR devices based on the SOI platform and the principle of mode evolution, multiple segments of tapered waveguides with different slopes are commonly spliced to form mode converters, a smaller slope is used within a width interval where mode hybridization is remarkable, and a larger slope is used within a width interval where mode hybridization is less remarkable, so as to reduce the size of a device. Moreover, a boundary effect exists in the benefit brought by the increase of tapered sections, and the benefit decreases constantly as the structure becomes gradually complicated.

Proposed herein is a polarization splitter-rotator composed of a Bezier curve gradient structure and a directional coupler, where the gradient region achieves width gradient based on the Bezier curve. The continuous slope transformation of the Bezier curve helps to reduce the size of the device, and in combination with the asymmetrical directional coupler with high coupling efficiency, the degree of integration of the polarization splitter-rotator is further improved. As compared to multi-slope tapered waveguides, the polarization splitter-rotator is simpler, and can be fabricated by single-step etching, thus having higher practical value.

Embodiments of the present disclosure can split input light signals $TE_0$ and $TM_0$, convert the $TM_0$ mode into the $TE_1$ mode in a specific waveguide structure region, and convert the $TE_1$ mode into the $TE_0$ mode for output in a specific coupling area. The compact on-chip polarization splitter-rotator of a Bezier curve gradient waveguide structurally includes a silica substrate, a common output waveguide and a specially-structured waveguide, the special waveguide being structurally composed of an input region, an output region, a Bezier curve gradient region and an asymmetrical polarization coupling region; a polarization mode coupling region composed of a Bezier curve gradient waveguide and an asymmetrical directional coupler, in which $TM_0$ mode can be converted into $TE_0$ mode and output in a splitting manner.

Further, regarding the Bezier curve gradient structure, air is taken as a medium, the substrate is composed of silicon dioxide, and the refractive index of the silicon dioxide at the wavelength of 1,550 nm is $n_{sio2}=1.445$.

Further, the Bezier curve gradient region is gradually widened in the Z direction, has an outer contour defined by a third-order Bezier curve, and the material used is also silicon.

Further, two waveguide structures of the asymmetrical directional coupling region are partitioned by an air gap as a medium, and both are made of silicon, and at the wavelength of 1,550 nm, the refractive index of the silicon is $n_{si}=3.455$; the input guide region and the output guide region are partitioned by air.

Further, the thickness of the silicon layer in the standard SOI-based wafer structure is 220 nm, and the thickness of oxide (BOX, $SiO_2$) buried at the bottom layer is 2 μm.

Further, regarding the input guide waveguide and the output guide waveguide, a width of the cross-end waveguide on the left side is $W_3$, and a width of the specially-structured waveguide on the right side changes from $W_1$ to $W_2$, and then from $W_2$ to $W_1$.

Further, the shape of the outer contour of the Bezier curve gradient waveguide is defined by the third-order Bezier curve, the middle end points for controlling the curve shape are $P_1$ and $P_2$, respectively, the waveguide length is $L_{tp}$, and a front-end width and a back-end width of the Bezier curve gradient waveguide are $W_1$ and $W_2$, respectively.

Further, the asymmetrical directional coupler is composed of two waveguides, a width of the cross-end waveguide on the left side is $W_3$, a width of the input-port waveguide on the right side is $W_1$, the waveguide gap is $W_{gap}$, and the length of the waveguide coupling region is $L_{DC}$.

It should be noted that with reference to FIG. 1 in the present disclosure, the Bezier curve gradient waveguide structure is a standard SOI-based wafer structure, the parameters of which are respectively set to be: $W_1=0.5$ μm, $W_2=0.86$ μm, $W_3=0.425$ μm, $L_{tp}=34$ μm, $L_{DC}=18$ μm and $W_{gap}=0.1$ μm. Under the above parameter settings, the ultra-wideband on-chip polarization splitter-rotator can operate for two kinds of input polarized light $TE_0$ and $TM_0$ within a wide working waveband of 1,500 nm to 1,700 nm, while achieving low insertion loss and high polarization conversion efficiency and crosstalk. Tolerance analysis shows that the polarization splitter-rotator has robustness at a high bandwidth.

FIG. 1 shows the structure of the designed PSR, which includes a Bezier curve gradient $TM_0$-$TE_1$ mode converter and a mode splitter of an asymmetrical directional coupler structure. The lengths of the two parts are $L_{tp}$ and $L_{DC}$, respectively. From the input terminal ($W_1$) to the output terminal ($W_2$) of the $TM_0$-$TE_1$ mode converter, as can be seen from the top view, one side of the strip-shaped waveguide is in the shape of a Bezier curve, and its slope is controlled by the position of the control points $P_1$ and $P_2$ of the Bessel curve. In the direction of light transmission, this section of waveguide changes from a single-mode waveguide that only supports orthogonal fundamental modes to a multimode waveguide supporting higher-order modes. In this process, the $TM_0$ mode input at the input terminal ($W_1$) will be coupled to the $TE_1$ mode on the output terminal ($W_2$), and the position of the control points $P_1$ and $P_2$ of the Bezier curve will be optimized together with the length $L_{tp}$ of the mode converter to achieve the highest coupling efficiency. The following part comes to the mode splitting/directional coupler. An asymmetrical directional coupler structure is formed from a narrow cuboid waveguide (width of $W_3$) placed in parallel on the left side and the rear part of the specially-structured waveguide on the right side (part with a width of $W_2$). By controlling a width $W_3$ of a narrow waveguide, the phase matching of $TE_1$-$TE_0$ is formed, thus splitting between the $TE_1$ and $TE_0$ modes in a wide waveguide is realized by transferring the energy of the $TE_1$ mode on the output terminal via mode coupling, and finally, the $TM_0$ mode on the input terminal is converted into the $TE_0$ mode on the output terminal of the mode coupling region. Additionally, the $TE_0$ mode of the input terminal will not be converted to other modes due to phase mismatch. Similarly, the $TE_0$ mode on the directional coupler structure will not have energy coupling and will pass through the coupling region and be output in the +Z direction, thus realizing the function of polarization splitting and rotating. Regarding the wide waveguide, a width of the output terminal at the end of the coupling region gradually becomes smaller so as to restore the end to $W_1=0.5$ μm, which is the same as that of the input terminal, and a single-mode waveguide is restored to facilitate the connection with other devices.

Figure 2:
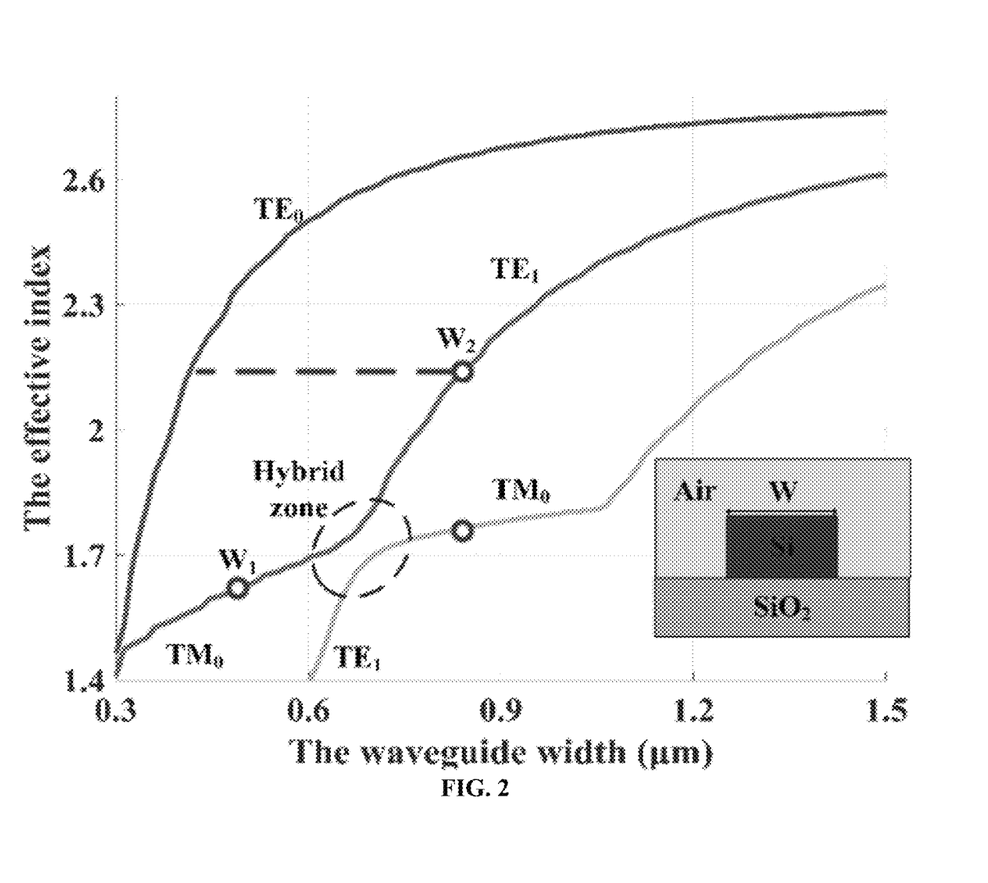
FIG. 2 shows a curve illustrating the change of the effective refractive index of the Eigenmode at a wavelength of 1,550 nm over a width of the rectangular silicon waveguide based on the Bezier curve gradient structure at specific geometric parameters according to an embodiment of the present disclosure.

FIG. 2 shows a curve illustrating the change of the effective refractive index of the Eigenmode over a width of the rectangular silicon waveguide at a wavelength of 1,550 nm. It can be seen that when the waveguide width is less than 0.67 μm, the effective refractive index of quasi-$TM_0$ mode is higher than that of quasi-$TE_1$ mode; and when the waveguide width is greater than 0.67 μm, the effective refractive index of quasi-$TE_1$ mode is higher than that of quasi-$TM_0$ mode. There exists strong mode hybridization between $TE_1$ mode and $TM_0$ mode in the vicinity of the waveguide width of 0.67 μm. The red dot in FIG. 2 shows the starting and ending range of mode hybridization. In a gradient waveguide, this kind of mode hybridization will lead to mode conversion, e.g., the $TM_0$ mode transmitted in the waveguide will be converted to $TE_1$ mode. It should be noted that the mode conversion process can only be achieved with the combination of appropriate coupling length. In order to take into account both short coupling length and high conversion efficiency, more energy should be converted from $TM_0$ mode to $TE_1$ mode in the region with a strong mode hybridization effect (as shown in the black elliptical region), which means that an efficient $TM_0$-$TE_1$ mode converter will make more use of this width interval, thus allocating more coupling lengths within this interval. In other words, the waveguide width transformation within this interval is smoother than that within other intervals.

Figure 3:
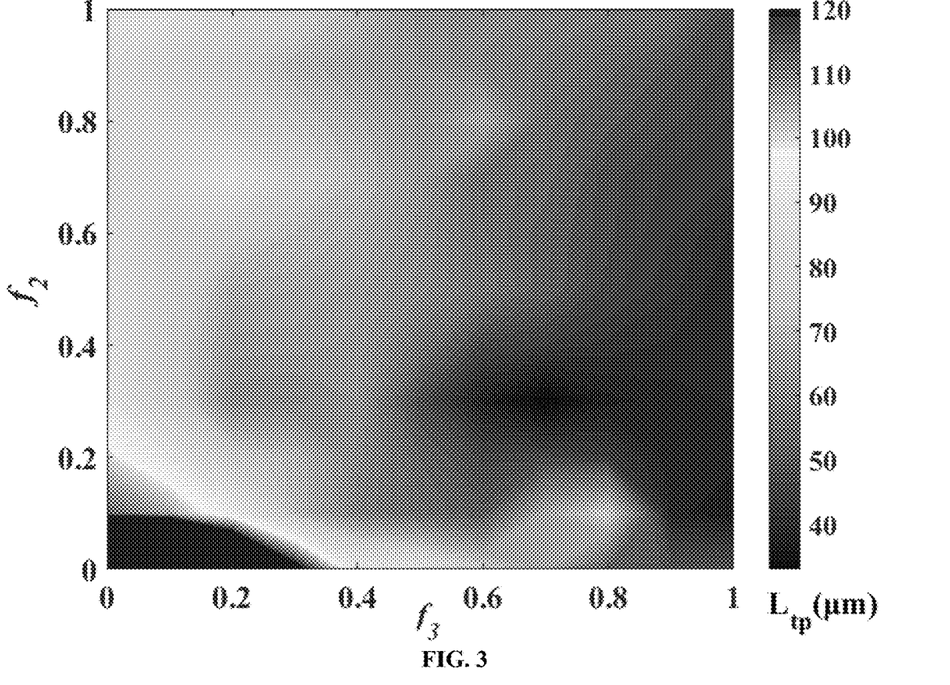
FIG. 3 shows a correspondence between length $L_{tp}$ of a mode converter and control point location factors $f_2$ and $f_3$ of the Bezier curve if the conversion efficiency of the $TM_0$-$TE_1$ mode converter is higher than −0.1 dB during input of the $TM_0$ mode and $TE_0$ mode with the wavelength of 1,550 nm at the input terminal based on the Bezier curve gradient structure under specific geometric parameters according to an embodiment of the present disclosure.

FIG. 3 shows a correspondence between length $L_{tp}$ of a mode converter and control point location factors $f_2$ and $f_3$ of the Bezier curve if the conversion efficiency of the $TM_0$-$TE_1$ mode converter is higher than −0.1 dB during input of the $TM_0$ mode and $TE_0$ mode with the wavelength of 1,550 nm at the input terminal based on the Bezier curve gradient structure under specific geometric parameters; it can be seen that when $X_2$ and $X_3$ approach the input terminal, a larger coupling length is required for high conversion efficiency, and when $X_3$ approaches the output terminal, a smaller coupling length is required for efficient mode conversion. At $f_2$=0.33, $f_3$=0.67, there is a minimum value 34 µm of $L_{tp}$, and at this moment, coordinates of the optimal Bessel function control point are $P_2$[11.3,8.6], $P_3$[22.7,5]. From this, an optimal structure of a Bezier curve waveguide can be obtained.

Figure 4:
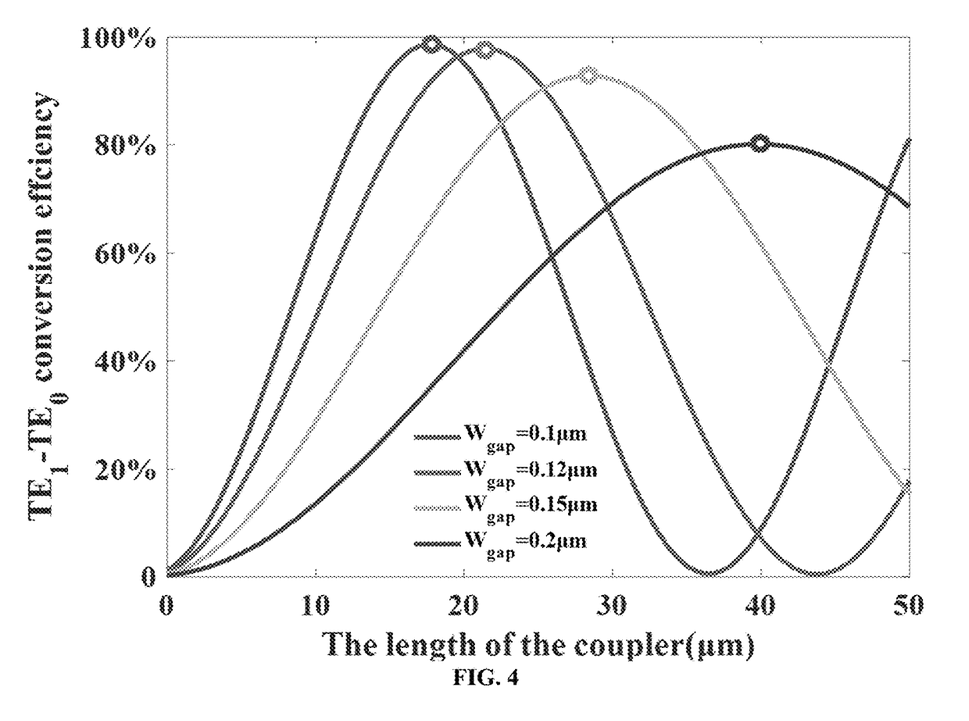
FIG. 4 shows a curve illustrating the change of the coupling efficiency of a directional coupler under different air vent gaps $W_{gap}$ over the length $L_{DC}$ of a coupler based on specific geometric parameters according to an embodiment of the present disclosure.

FIG. 4 shows the relationship between the coupling efficiency of converting from the $TE_1$ mode in the wide waveguide to the $TE_0$ mode in the narrow waveguide and the coupling length at $W_{gap}$=0.1 µm, $W_{gap}$=0.12 µm, $W_{gap}$=0.15 µm, $W_{gap}$=0.2 µm, respectively, and in this figure, the coupling length required for the maximum coupling efficiency is also marked. As can be seen from FIG. 4, the coupling efficiency is first rapidly improved with the increase of $W_{gap}$, and due to a larger refractive index difference between a silicon waveguide and air, and a smaller overlapped area between mode fields of two coupling modes, the coupling efficiency is rapidly lowered with the increase of $W_{gap}$. Therefore, with $W_{gap}$=0.1 µm, the highest conversion efficiency of the corresponding $TE_1$-$TE_0$ appears when the length of the directional coupler is $L_{DC}$=18 µm, from which the optimal structure parameters of the $TE_1$-$TE_0$ directional coupler can be obtained.

Figure 5A:
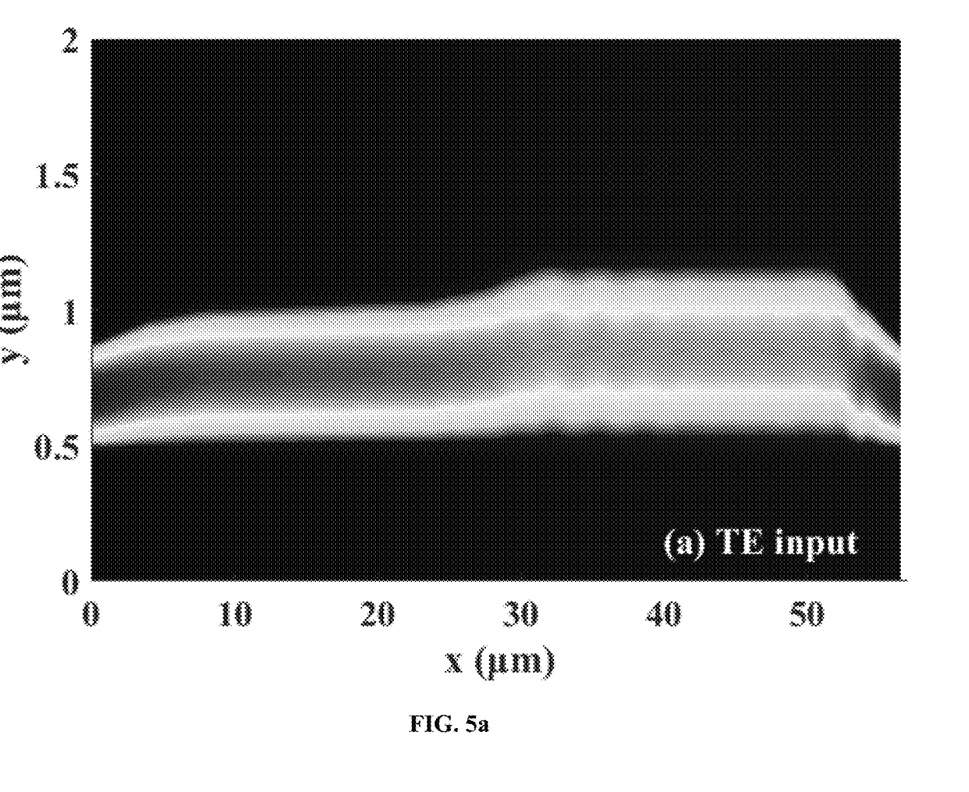
FIG. 5 is a diagram of the magnetic field distribution in the XOZ plane when the TM0 mode (FIG. 5b) and TE0 mode (FIG. 5a) are input with the wavelength of incident light of 1,550 nm according to an embodiment of the present disclosure.
Figure 5B:
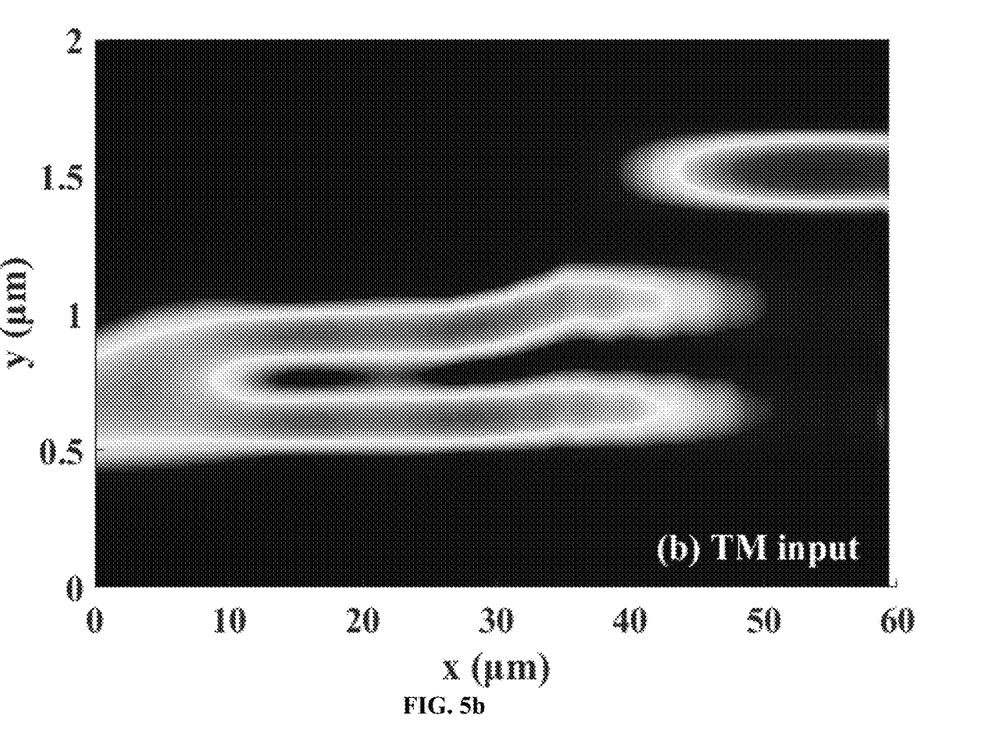

FIGS. 5(a) and 5(b) respectively show a diagram of the magnetic field distribution in the XOZ plane when the wavelength of incident light is 1,550 nm, and the $TM_0$ mode and $TE_0$ mode are input at the time optimal structure parameters are selected. The polarization splitter-rotator has an overall length of about 52 µm, with a high degree of integration. When the $TM_0$ mode is transmitted from the input terminal, the $TE_0$ mode output can be obtained from the cross-end output terminal of the PSR. Moreover, when the $TE_0$ fundamental mode is input, it is impossible for the $TE_1$ higher-order mode to be coupled with the adjacent narrow waveguide because of the phase mismatch, and therefore, the output of the $TE_0$ fundamental mode is obtained at the output end of the straight waveguide of the PSR. It can be seen that the TE polarized light and the TM polarized light are split, and in the meanwhile, the $TM_0$ fundamental mode is also converted into the $TE_0$ mode in the coupling region.

Figure 6A:
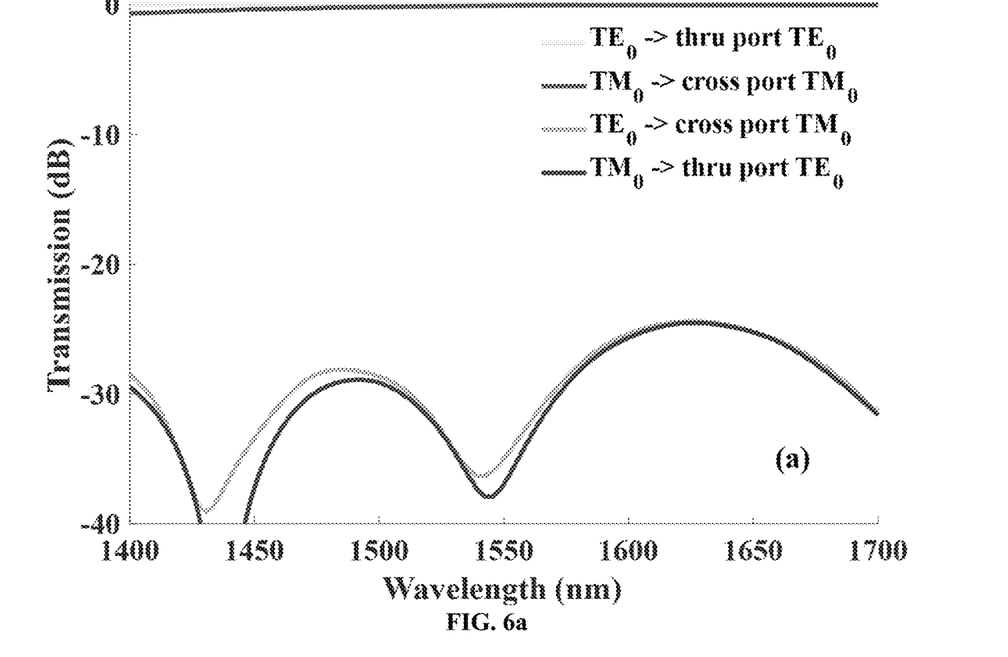
FIG. 6(a) shows a transmissivity spectrum regarding the output of the $TE_0$ mode and $TM_0$ mode at each terminal during input of different polarization modes according to the present disclosure.
Figure 6B:
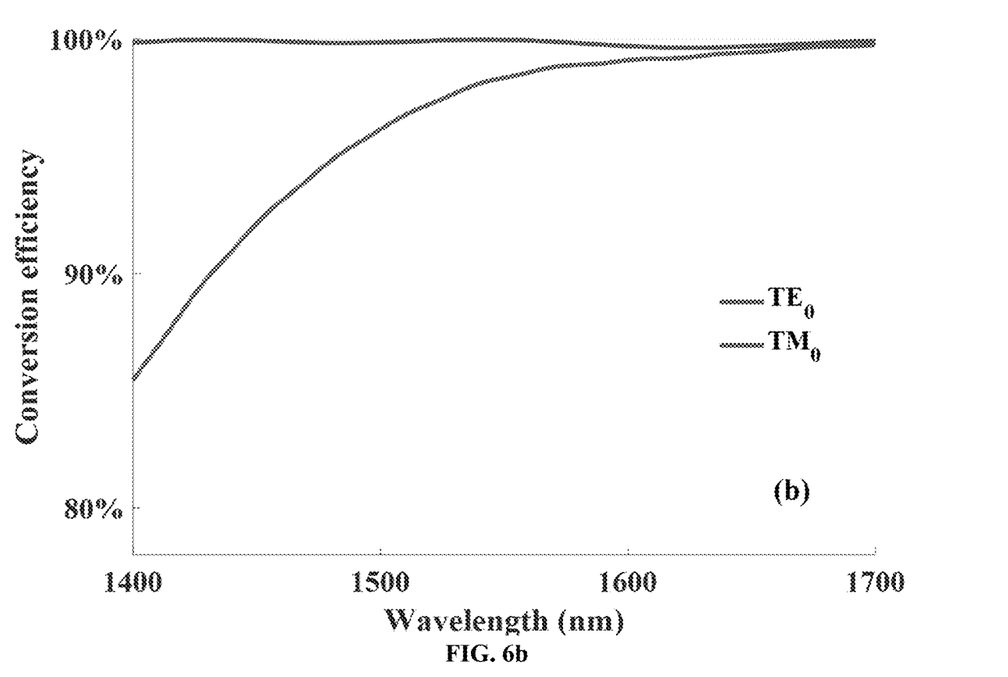
FIG. 6(b) shows conversion efficiency for two orthogonal fundamental modes when different polarization modes are input according to the present disclosure.

FIG. 6 shows a transmission spectrum of the designed polarization splitter-rotator for input light signals with different wavelengths of 1,400 nm to 1,700 nm. FIG. 6(a) shows the curve illustrating the change of transmissivity at the cross terminal and the through terminal with the incident wavelength during the input of the $TM_0$ mode and $TE_0$ mode, while FIG. 6(b) shows the conversion efficiency of $TM_0$ mode and $TE_0$ mode for the target mode, respectively. As can be seen from FIG. 6(a), the polarization splitter-rotator designed herein exhibits excellent crosstalk resistance in each waveband for two different input modes, the crosstalk being lower than −25 dB within the wavelength range of 1,400 nm to 1,700 nm. As can be seen from FIG. 6(b), when the input mode is $TE_0$, the conversion efficiency is not sensitive to the change of wavelength, while when the input mode is $TM_0$, the conversion efficiency is relatively low in the short waveband. This is because the input $TE_0$ mode does not involve mode conversion in the waveguide gradient part, and no energy coupling occurs in the coupling region at both ends. On the contrary, for the input $TM_0$ fundamental mode, the conversion efficiency is sensitive to the wavelength, which is due to the wavelength dependence of the mode conversion in the tapered region and the mode coupling in the coupling region. When the wavelength is lower than 1,500 nm, the coupling efficiency is relatively low, while in the wavelength range from 1,500 nm to 1,700 nm, the insertion loss is lower than 0.15 dB, and the polarization extinction ratio is higher than 20 dB. Therefore, the PSR has a wide range of operating wavelengths.

Figure 7A:
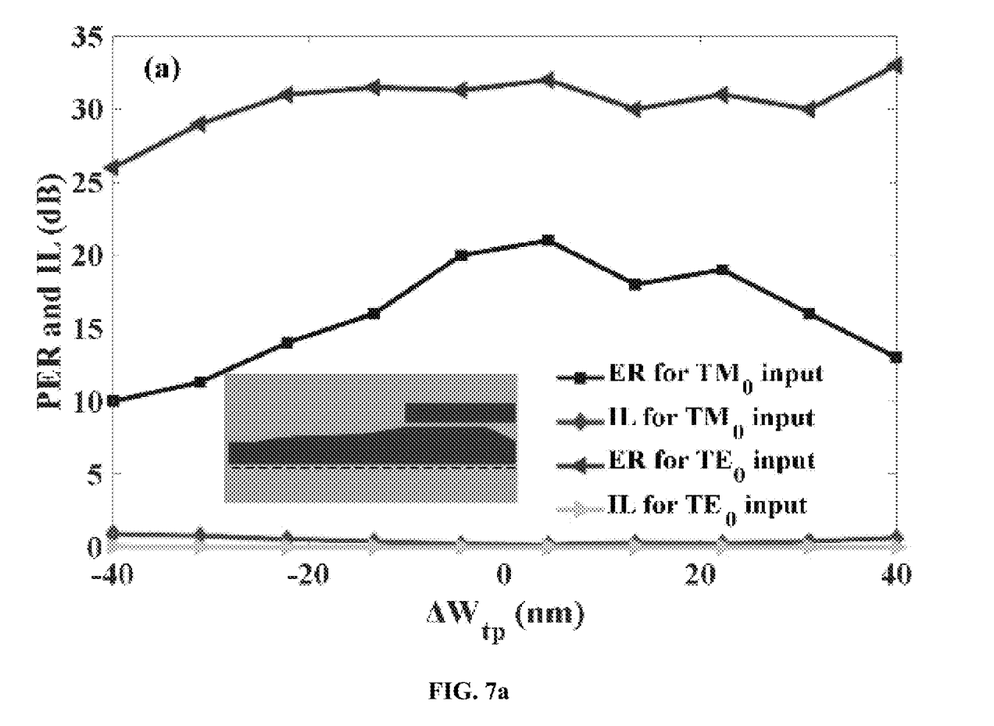
FIG. 7(a) shows a curve illustrating change of insertion loss and polarization conversion efficiency of two orthogonal fundamental modes over errors of a width $\Delta W_{tp}$ in the +Z direction according to the present disclosure.
Figure 7B:
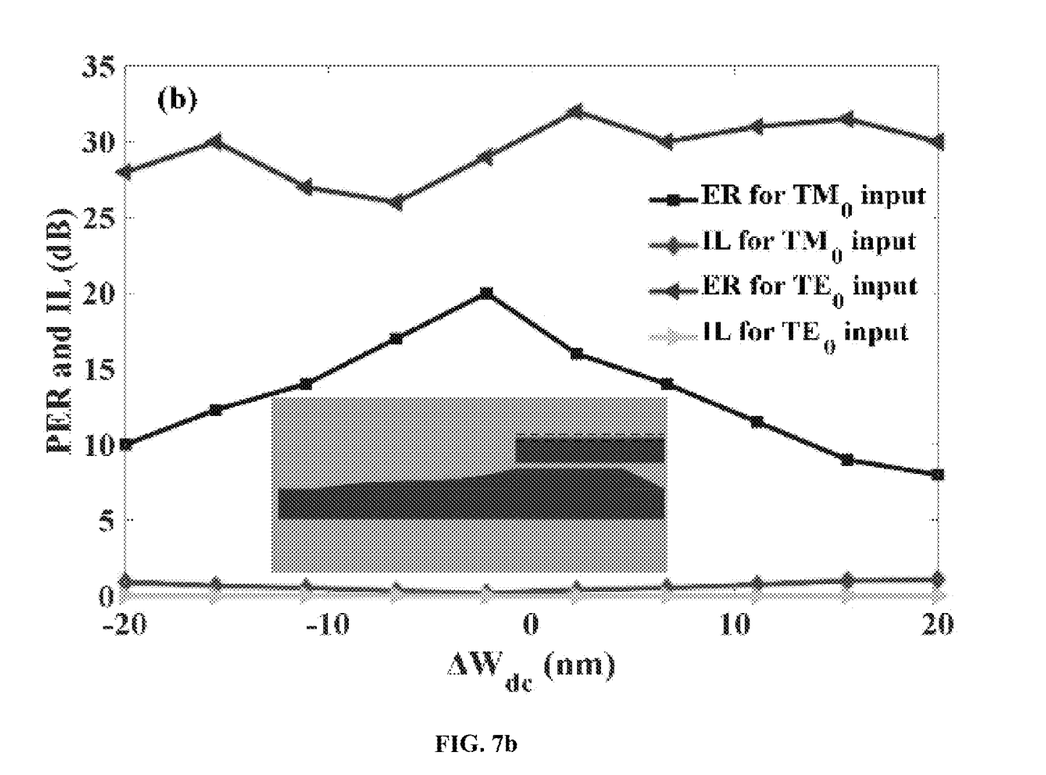
FIG. 7(b) shows a curve illustrating change of insertion loss and polarization conversion efficiency of two orthogonal fundamental modes over errors of a width $\Delta W_{DC}$ of a mode coupling region according to the present disclosure.
Figure 7C:
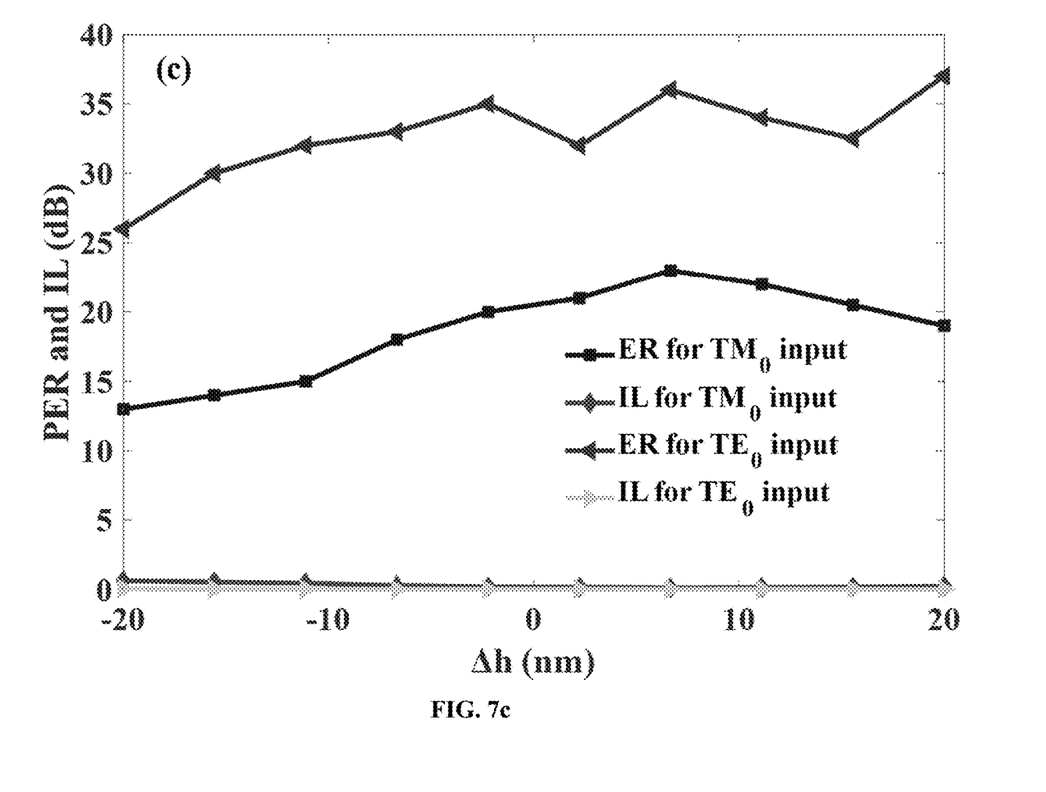
FIG. 7(c) shows a curve illustrating change of insertion loss and polarization conversion efficiency of two orthogonal fundamental modes over errors of SOI wafer thickness $\Delta h$ according to the present disclosure.

FIG. 7 shows a curve illustrating change of insertion loss and polarization conversion efficiency of two orthogonal fundamental modes over fabrication errors according to the present disclosure; for deviation and errors that may exist in the actual fabrication process, $\Delta W_{tp}$, $\Delta W_{DC}$ and $\Delta h$ are adopted to denote a width error of a wide waveguide, width error of a narrow waveguide and the height error of a silicon layer of a device, respectively, and the effects of $\Delta W_{tp}$, $\Delta W_{DC}$ and $\Delta h$ on the performance of the PSR are calculated. The results are shown in FIGS. 7(A)-(c), respectively. It can be seen that for the gradient waveguide width error $\Delta W_{tp}$ of −40 nm to 40 nm and the narrow waveguide width error $\Delta W_{DC}$ of −15 nm to 15 nm, during input of the $TE_0$ fundamental mode, it has little effect on the performance of the device, and the insertion loss is lower than 0.1 dB; while during input of the $TM_0$ fundamental mode, the polarization conversion efficiency decreases to a certain extent under the influence of error, which is maintained at PER>10 dB and IL<0.6 dB within the tolerance range. By reference to FIG. 7(c), for the gradient waveguide width error $\Delta h$ from −20 nm to 20 nm, the polarization conversion efficiency PER of each mode is higher than 13 dB and IL is smaller than 0.5 dB; even when 0 nm<$\Delta h$<13 nm, the error will slightly improve the final performance of a PSR, which may be caused by the increase of coupling efficiency along with the increase of the silicon chip area. Error analysis shows that under the error of ±20 nm, the performance of the device is still stable, and as compared to optimal parameters, PER and CT are reduced by about 5 dB, and IL is lowered about 0.4 dB. Such tolerance space can significantly improve the yield during fabrication.

In this embodiment, the common waveguide structure is composed of a cuboid waveguide, and the specially-structured waveguide is composed of an input region, an output region, a width-gradient waveguide (Bezier curve gradient structure) and a coupling region. A width of the gradient waveguide is determined by a third-order Bezier curve, and the coupling region is composed of two asymmetrical waveguide regions. Waveguide structures on the substrate at the bottom layer are both made of silicon. In this embodiment, based on the silicon dioxide substrate, two waveguides possess the same thickness, and evanescent wave coupling is achieved merely through the gradient change in a width direction. The compact on-chip polarization splitter-rotator achieves polarization splitting and rotating on two kinds of input polarized light $TE_0$ and $TM_0$ within a wide working waveband, having low insertion loss and high polarization conversion efficiency and crosstalk. Tolerance analysis shows that the polarization splitter-rotator achieves higher polarization conversion efficiency and lower insertion loss within a specific device length and wide wavelength range, thus endowing it with superior performance over devices of the same kind.

Finally, it should be noted that the above embodiments are merely used to explain the technical solutions of the present application, but are not intended to limit the present application. Although the present application is described in detail with reference to the foregoing embodiments, the person of ordinary skill in the art should understand that they can still modify the technical solutions described in the foregoing embodiments, or make equivalent substitutions on some or all technical features therein. These modifications or substitutions do not make the essence of the corresponding technical solutions deviate from the spirit and scope of the technical solutions of the embodiments of the present application.

The invention claimed is:

1. A compact on-chip polarization splitter-rotator based on a Bezier curve gradient waveguide, wherein the compact on-chip polarization splitter-rotator based on a Bezier curve gradient waveguide comprises a substrate (1), and a waveguide structure is disposed on a surface of the substrate (1); the waveguide structure comprises a common output waveguide (2) and a specially-structured waveguide (3) which are parallel to each other, and are partitioned by an air gap $W_{gap}$ as a medium; the common output waveguide (2) is a cuboid in structure, when a direction from input to output is denoted as a +Z direction, the specially-structured waveguide (3) is composed of an input guide region (4), a Bezier curve gradient region (5), an asymmetrical directional coupling region (6), and an output guide region (7) which are cascaded sequentially in the +Z direction; the common output waveguide (2) corresponds to the asymmetrical directional coupling region (6) and the output guide region (7) in the +Z direction.

2. The compact on-chip polarization splitter-rotator based on a Bezier curve gradient waveguide according to claim 1, wherein the substrate (1) is made of silicon dioxide.

3. The on-chip polarization splitter-rotator based on a Bezier curve gradient waveguide according to claim 1, wherein the input guide region (4), the Bezier curve gradient region (5), the asymmetrical directional coupling region (6) and the output guide region (7) are all made of silicon.

4. The on-chip polarization splitter-rotator based on a Bezier curve gradient waveguide according to claim 1, wherein the substrate (1) has a thickness of 2 µm, and the common output waveguide (2) and the specially-structured waveguide (3) each have a thickness of 220 nm.

5. The compact on-chip polarization splitter-rotator based on a Bezier curve gradient waveguide according to claim 1, wherein the Bezier curve gradient region (5) is gradually widened in the +Z direction, and has an outer contour defined by a third-order Bezier curve.

6. The compact on-chip polarization splitter-rotator based on a Bezier curve gradient waveguide according to claim 5, wherein a length of the Bezier curve gradient region (5) is denoted as $L_{tp}$, poles of the third-order Bezier curve for the outer contour are located at a front end point, $P_2$, $P_3$ and a back end point of a waveguide in a region, respectively, wherein the point $P_2$ has a same location as the back end point in the +X direction, and is located at ⅓ of $L_{tp}$ in the +Z direction, and the point $P_3$ has a same location as the front end point in the +X direction, and is located at ⅔ of $L_{tp}$ in the +Z direction.

7. The compact on-chip polarization splitter-rotator based on a Bezier curve gradient waveguide according to claim 6, wherein a width of the output guide region (7) is decreased linearly in the +Z direction.

8. The compact on-chip polarization splitter-rotator based on a Bezier curve gradient waveguide according to claim 7, wherein a width of the input guide region (4) is denoted as $W_1$, and is the same as that of an extreme terminal of the output guide region (7); a width of the asymmetrical directional coupling region (6) is denoted as $W_2$, that is, a front-end width and a back-end width of the Bezier curve gradient region (5) are $W_1$ and $W_2$, respectively, and an overall width of the specially-structured waveguide (3) is increased to $W_2$ from $W_1$, and then decreased to $W_1$ from $W_2$.

9. The compact on-chip polarization splitter-rotator based on a Bezier curve gradient waveguide according to claim 8, wherein a width of the common output waveguide (2) is denoted as $W_3$, $W_3$ being smaller than $W_1$.

10. The compact on-chip polarization splitter-rotator based on a Bezier curve gradient waveguide according to claim 9, wherein $W_1=0.5$ µm, $W_2=0.86$ µm, $W_3=0.425$ µm, $L_{tp}=34$ µm, $L_{DC}=18$ µM, and $W_{gap}=0.1$ µm.

* * * * *